(12) United States Patent
Yankloski

(10) Patent No.: US 7,880,099 B1
(45) Date of Patent: Feb. 1, 2011

(54) SHAPE BASED POSTAGE RATE MEASUREMENT SYSTEM

(75) Inventor: Richard A. Yankloski, Webster, NY (US)

(73) Assignee: Data-Pac Mailing Systems Corp., Webster, NY (US)

( * ) Notice: Subject to any disclaimer, the term of this patent is extended or adjusted under 35 U.S.C. 154(b) by 202 days.

(21) Appl. No.: 12/157,457

(22) Filed: Jun. 11, 2008

Related U.S. Application Data

(60) Provisional application No. 60/934,103, filed on Jun. 11, 2007.

(51) Int. Cl.
*G01G 19/40* (2006.01)
*G01B 5/02* (2006.01)
*G01F 17/00* (2006.01)

(52) U.S. Cl. ................ 177/25.15; 705/407; 33/1 V; 33/562

(58) Field of Classification Search .......... 177/25.15, 177/145, 238; 33/1 V; 705/407
See application file for complete search history.

(56) References Cited

U.S. PATENT DOCUMENTS

| | | | |
|---|---|---|---|
| 4,488,610 A | 12/1984 | Yankloski | |
| 5,340,097 A | 8/1994 | Yankloski | |
| 5,538,234 A | 7/1996 | Yankloski | |
| 5,767,452 A | 6/1998 | Yankloski | |
| 5,909,013 A * | 6/1999 | Dlugos | 177/25.11 |
| 5,914,464 A * | 6/1999 | Vogel | 177/25.11 |
| 5,967,504 A | 10/1999 | Yankloski | |
| 6,138,371 A * | 10/2000 | Lippa et al. | 33/562 |
| 7,098,410 B2 * | 8/2006 | Galtier et al. | 177/1 |
| 7,693,802 B2 * | 4/2010 | Defosse | 705/407 |
| 7,792,764 B2 * | 9/2010 | Collings | 705/407 |
| 2004/0016577 A1 * | 1/2004 | Lichtinger et al. | 177/144 |
| 2005/0104274 A1 * | 5/2005 | Yankloski | 271/10.01 |
| 2007/0198440 A1 * | 8/2007 | Defosse | 705/407 |

* cited by examiner

*Primary Examiner*—Randy W Gibson
(74) *Attorney, Agent, or Firm*—Kenneth J. Lukacher

(57) ABSTRACT

Shape based postage rate criteria as to whether a postage item (an envelope) is greater than certain thicknesses above which the rate of postage of the item changes is provided by a gauge utilizing the platform of a scale on which the item is weighed. A roller is pivotally mounted on an arm so as to be set at heights over the platform at which the postage rate changes, for example, for envelopes ¼" thick and for envelopes ¾" thick, the envelope is then slid between the roller and the weighing platform. A display operated by the scale reads a weight change if the envelope is above the thickness at which the roller is set. Accordingly, the shape of the postage item provides a direct indication of whether the envelope satisfies postage rate criteria established by the postal authorities.

8 Claims, 1 Drawing Sheet

SHAPE BASED POSTAGE RATE MEASUREMENT SYSTEM

Priority is claimed to U.S. Provisional Application No. 60/934,103, filed Jun. 11, 2007, which is herein incorporated by reference.

FIELD OF THE INVENTION

This invention relates to a system for determination of the amount of postage based on the shape of the mailing package (e.g., the mailing envelope). The invention utilizes a postage scale to effect a part of the shaped based rate determination, especially rate based on the thickness of the envelope.

BACKGROUND OF THE INVENTION

Postage rates depend upon thickness of the envelope. The United States Postage Service (USPS) requires additional postage for an envelope exceeding ¼" thick when the envelope does not exceed 6⅛" by 11½" (letter size), or if the envelope is larger than 6⅛" by 11½" (flat size) additional postage is required when the flat exceeds ¾" in thickness. Any package over 12" by 15" is considered a parcel and parcel rates apply.

The USPS does not accept rate measurement based upon the use of a slot as a gauge, if the slot is horizontal or even vertical, when force can be applied to the envelope to pass it through the slot. The slot gauge is not acceptable even if use thereof does not apply any force to the envelope to get it into or through the slot gauge.

SUMMARY OF THE INVENTION

Accordingly, it is principal feature of this invention to provide a system for shaped based postage rate calculation, and especially calculation which involves the thickness of a letter or flat size envelope without requiring passage through a slot size measurement gauge.

Briefly, the invention utilizes a scale presenting a weighing surface or platform on which the envelope is disposed. A gauging member is located above the surface, preferably on a pivot so that it can be moved away from the surface for parcel weighing, or ¼" or ¾" away from the surface for letter or flat size envelope weighing, respectively. The weight of the envelope while under the gauge member determines whether its thickness does not exceed or exceeds the postage rate shape criteria. The reading of the weight will increase, if the thickness shaped criteria is exceeded. The weight and reading can be inputted from the scale to a postage rate meter or engine which maybe part of a printer which prints postage indicia on the envelope or on a tape which is affixed to the envelope. Conventional mailing machines maybe used for printing on the envelope or tape.

The system of the invention includes a device which is an attachment to a scale or weighing platform with weight readout. The device is designed to provide an accurate measurement of the thickness of an envelope of either over a ¾ of an inch or over ¾ of an inch. The device is specifically designed to provide a universal gauging system for the recent USPS rate case involving charging for envelopes, flats and parcels according to shape. The USPS terminology is SPB or Shaped Based Pricing. Upon initiating this rate case it became apparent that envelopes vary in thickness according to many factors, such as air contained therein, folds, warping and other factors. The thickness was left to guess work depending on how hard a human pushed the envelope through at ¼" or ¾" gauge. The USPS requires that zero force (e.g., only force of gravity) be applied to envelope while measuring. The system of the invention solves the problem by establishing, with the device, an exact, very sensitive gauge to determine the thickness cross over. The device is attached to the frame of the scale or weighing platform. The device can rotate to either ¼" or ¾" above the platform and toward and away from the front of the scale to remove it from inhibiting large parcels.

In operation with the gauge set at ¼", an envelope to be checked is placed on the scale under a roller fixed at a distance of ¼" from the weighing platform of the scale and the weight reading is observed on the display. The envelope is slid under the fixed roller and the display is checked for a change in weight. If the weight changes, the envelope is over ¼" thick. If the weight did not change, the envelope is less than ¼" thick. The gauge is rotated to the ¾" position and the same procedure is applied to check if the envelope is over ¾" thick. The gauge can also be rotated to a neutral position for full access to the top of the scale platform.

The foregoing and other objects features and advantages of the invention will become more apparent from FIG. 1 which is a schematic diagram of apparatus providing a shaped based postage rate measurement system embodying the invention.

DETAILED DESCRIPTION OF THE PREFERRED EMBODIMENT

Figure 1:
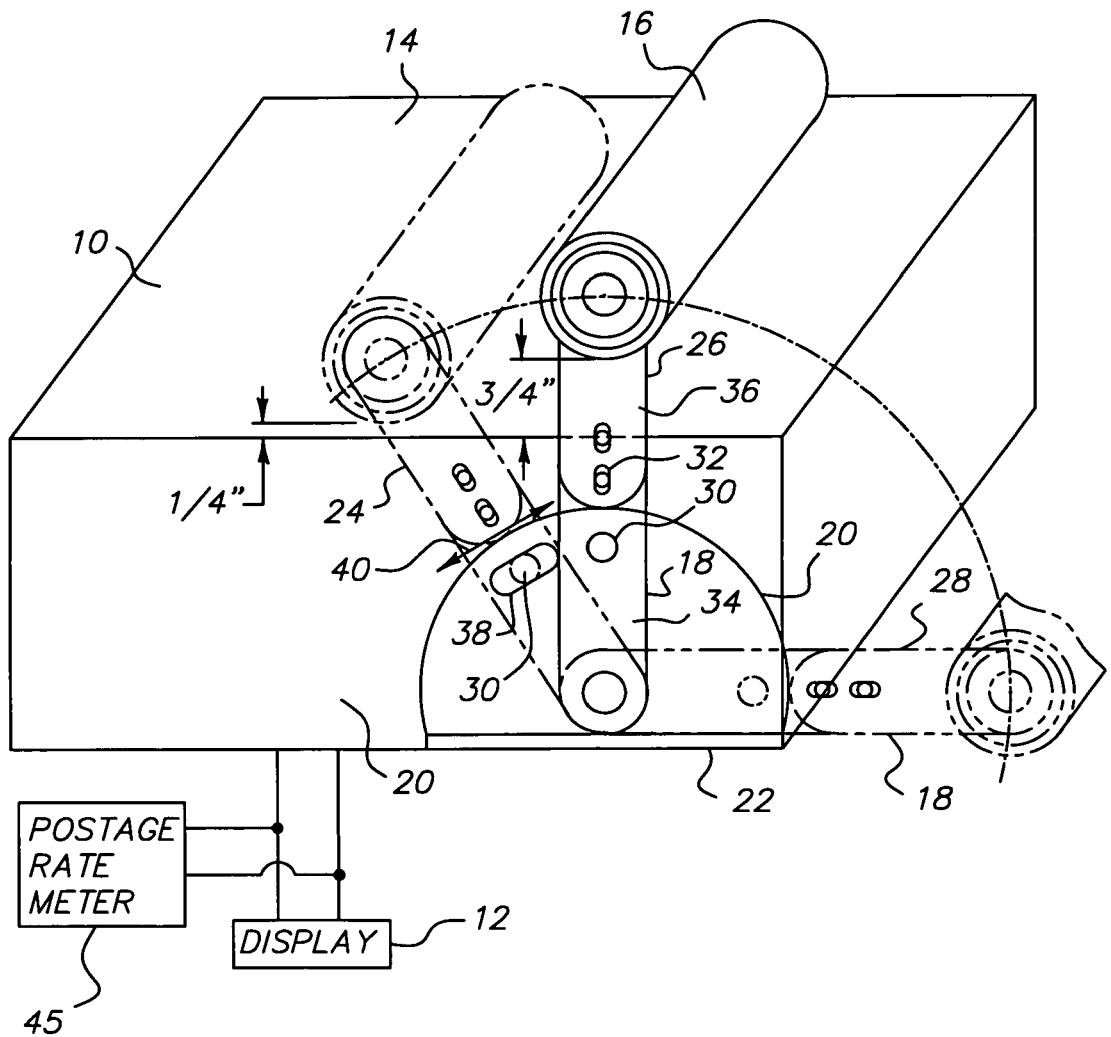
FIG. 1 is a schematic diagram of a shape based postage rate measurement system.

In FIG. 1, a scale 10 having a weight readout or display 12 provides a weighing platform or surface 14. Above the surface 14 is a gauging roller 16 which may optionally be fixed or journaled on a frame 20. The frame is located on opposite sides 20 of the scale 10. Weighing platform 14 moves downwardly in response to the weight of the item (e.g., an envelope) being weighed. The frame 20 is provided by a bracket with locating holes to set arms 18 and the roller 16 at three positions shown in full at 90 degrees for flat size envelopes, and in dash lines at zero degrees out of the way of parcels to be weighed, and also at the correct angular adjustment for thickness measurement of letter size envelopes. These positions are indicated at 24, 26, and 28.

The location of the arms 18 and roller member 16 is set by pins 30 on the arms. These pins maybe spring loaded to enable them to be pulled out, thus allowing the arms 18 to be rotated.

The arms are adjustable in length by a mechanism 32 which maybe provided by making the arms in two parts 34 and 36, which slide over each other. One of these parts may carry a locking bolt (not shown) and the other part maybe slotted. The adjustment is carried out set the height of the gauging roller 16.

First, the adjustment mechanism 32 is set when the arm 18 is at the vertical (90 degree) position 26. This sets the roller 16 outer periphery at ¾" from the platform surface 14. Then the arms 18 are moved to position 24. The roller 16 periphery is set a ¼" from the surface 14. Any adjustment to provide this setting is obtained with an adjustment mechanism 38, which may be a bolt and slot mechanism 32, which permits the upper arm section 36 to be moved laterally in the direction of the arrows 40 with the respect to the lower arm section 34.

The arm 18 is locked in position 28 away from the weighing platform when the scale is used to weigh parcels.

In operation, an envelope is placed on the platform 14. The weight of the envelope is displayed on the readout display 12.

The envelope is then passed along the platform under the gauge roller 16. For letter size envelopes, the roller 16 is in position 24, and for flat size envelopes the roller 16 is at position 26. If the envelope does not exceed the thickness criteria, the weight measured by the scale 10 and shown on the display 12 will not increase. However, should the weight increase, the envelope is too thick for the lower postage rate. The postage maybe calculated manually or automatically in response to the weight and thickness reading from the scale. The weight reading from the scale may be fed to a postage rate meter 45 of the type conventionally used to print postage on the envelope or a tape which is affixed thereto.

The foregoing description should be taken as illustrative and not in a limiting sense.

The invention claimed is:

1. A system for shape based postage rate measurement which comprises a scale having a platform on which an item for which postage rate is to be determined is located, a member disposed at predetermined height above the platform corresponding to postage rate criteria in effect, and means for reading the weight of the item detected by the scale for gauging whether the rate criteria is being met by an increase in the weight when item is located under the member from the weight when the item is not under the member.

2. The system according to claim 1 wherein the member is a roller, the periphery of which is positioned at the predetermined height above the platform.

3. The system according to claim 2 further comprising a pivotal arm on which the roller is disposed.

4. The system according to claim 3 further comprising a mechanism for setting the height of the roller above a pivot about which the arm is rotatable.

5. The system according to claim 4 further comprising a bracket adjacent to the arm and means for fixing the arm to the bracket to set the roller at one of a plurality of predetermined heights.

6. A method of shape based calculation of postage amount due for mailing an item which comprises the steps of:
   weighing the item with the aid of a scale having a platform on which the item is placed; and
   indicating whether the item is above or below a given size which corresponds to a difference in the amount of postage due by gauging the item in accordance with the weight of said item on said scale.

7. The method according to claim 6 wherein said indicating step includes the step of limiting the movement of the item along the scale during weighing when it is of a thickness greater than a thickness corresponding to the given size so that the item presses on and is weighed by the scale.

8. The method according to claim 7 wherein said size limiting step is carried out to provide for increasing the weight exerted by the item on said scale and said item is a selected one of a plurality of different heights.

\* \* \* \* \*